(12) United States Patent
Petralia et al.

(10) Patent No.: US 7,600,675 B2
(45) Date of Patent: Oct. 13, 2009

(54) METHOD FOR PROVIDING FINANCIAL INSTRUMENTS TO CUSTOMERS OF A SERVICE PROVIDER

(75) Inventors: Kathryn Petralia, Atlanta, GA (US); Robert James Frohwein, Atlanta, GA (US)

(73) Assignee: Compucredit Intellectual Property Holdings Corp. II, Las Vegas, NV (US)

( * ) Notice: Subject to any disclaimer, the term of this patent is extended or adjusted under 35 U.S.C. 154(b) by 628 days.

(21) Appl. No.: 11/321,633

(22) Filed: Dec. 28, 2005

(65) Prior Publication Data

US 2007/0162381 A1    Jul. 12, 2007

(51) Int. Cl.
*G06K 5/00* (2006.01)

(52) U.S. Cl. ...................... 235/380; 235/379

(58) Field of Classification Search ................. 235/380, 235/375, 379, 494, 492
See application file for complete search history.

(56) References Cited

U.S. PATENT DOCUMENTS

2005/0027543 A1 *   2/2005   Labrou et al. .................. 705/1

* cited by examiner

*Primary Examiner*—Karl D. Frech
(74) *Attorney, Agent, or Firm*—Smith Frohwein Tempel Greenlee Blaha, LLC (57) ABSTRACT

Methods for providing financial instruments to customers and applicants of a service provider are disclosed. One method, among others, includes providing a device such as a mobile telephone to a user, and providing the user with a contactless card having a financial account identifier that is associated with a financial account.

29 Claims, 5 Drawing Sheets

METHOD FOR PROVIDING FINANCIAL INSTRUMENTS TO CUSTOMERS OF A SERVICE PROVIDER

TECHNICAL FIELD

The present invention is generally related to providing financial instruments and, more particularly, is related to a method for providing a customer of a service provider with a financial instrument.

BACKGROUND OF THE INVENTION

Today, there exist contactless credit cards such as, Express-Pay offered by American Express, Chase Blink Card by offered by Chase Bank, and PayPass offered by MasterCard. These cards are improvements on conventional credit cards. They include a contactless technology embedded in what appears to be a conventional card such that when the contactless card is waved in proximity to a reader account information is transmitted from the card to the reader.

There is very little, if any, benefit gained by having one of these contactless cards. A user will still carry the contactless card in a wallet or purse, and when the user wants to use the contactless card, the user will have to fish his or her card out his or her wallet or purse before waving the card in the proximity of a reader. Thus, as far as the user is concerned, there is very little difference between the user using a conventional card and a contactless card. If the user uses a conventional card, the user will (1) extract a conventional card from his or her wallet or purse, and (2) swipe the conventional card in a reader. Whereas, if the user uses a contactless card, the user will (1) extract the contactless card from his or her wallet or purse, and (2) wave the contactless card in proximity to a reader.

Thus, a heretofore unaddressed need exists in the industry to address the aforementioned deficiencies and inadequacies.

SUMMARY OF THE INVENTION

Embodiments of the present invention can be viewed as providing customers of a first service provider with financial services from a second service provider. In this regard, one embodiment of such a method, among others, can be broadly summarized by the following steps: causing a customer to receive an offer for a credit account, wherein a mobile telephone is associated with the customer, wherein the credit account is associated with the telephone service provider; causing the customer to receive a contactless card having an identifier of the credit account therein, wherein the contactless card is electrically isolated from electric circuitry of the mobile telephone; and providing an economic benefit to the telephone service provider.

Another embodiment of such a method, among others, can be broadly summarized by the following steps: causing the customer to receive an offer for a credit account, wherein a mobile telephone is associated with the customer, wherein the credit account is provided by a financial service provider; causing the customer to receive a contactless card having an identifier of the credit account therein, wherein the contactless card is electrically isolated from electric circuitry of the mobile telephone; and receiving an economic benefit from the financial service provider.

Other methods, features, and advantages of the present invention will be or become apparent to one with skill in the art upon examination of the following drawings and detailed description. It is intended that all such additional methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

An aspect, which is common to several embodiments, of the invention is that a customer of a service provider may carry a device that provides a service from the service provider, and the device may be configured to include a contactless card that has a financial account identifier stored therein. The financial account identifier is associated with a financial instrument such as, but not limited to, instruments that are commonly referred to as a credit card or debit card.

The contactless card is configured to contactlessly provide the financial account identifier to card readers, i.e., devices that are configured to wirelessly interface with the contactless card. When the customer wishes to make a purchase of goods or services from a seller having a card reader, the customer waves his device in the vicinity of the card reader, which then reads the financial account identifier, and may read other information such as, but not limited to, a security code and user information such as name, zip code, etc. and a security code. The financial account associated with the financial account identifier is then charged for the amount of the purchase. In this manner, the customer can make credit and/or debit purchases without having to carry a traditional credit card and/or traditional debit card. For the sake of clarity, non-limiting embodiments of the present invention are described in terms of the service provider being a telephone service provider and the device as being a mobile telephone. It should recognized by those skilled in the art that other devices and service provider are intended to be within the scope of the invention. As a non-limiting example, embodiments of the present invention might include a content provider such as a provider of audio and/or video content and might include a device such as a portable content player such as a video and/or audio player. Furthermore, it should be noted that the financial account may include financial accounts provided by banks Referring to FIG. 1, a customer (not shown) of a telephone service provider 102 carries a mobile telephone 104, which includes a contactless card 106. The telephone is typically a standard mobile telephone for, among other things, communicating over a wireless network 108. The telephone 104 includes all of the necessary components and electrical circuitry for providing telephony service. In some embodiments, the telephone 104 may be modified to receive the contactless card 106. However, it should be noted that the contactless card 106 is electrically isolated from the components and electrical circuitry of the telephone 104.

Figure 1:
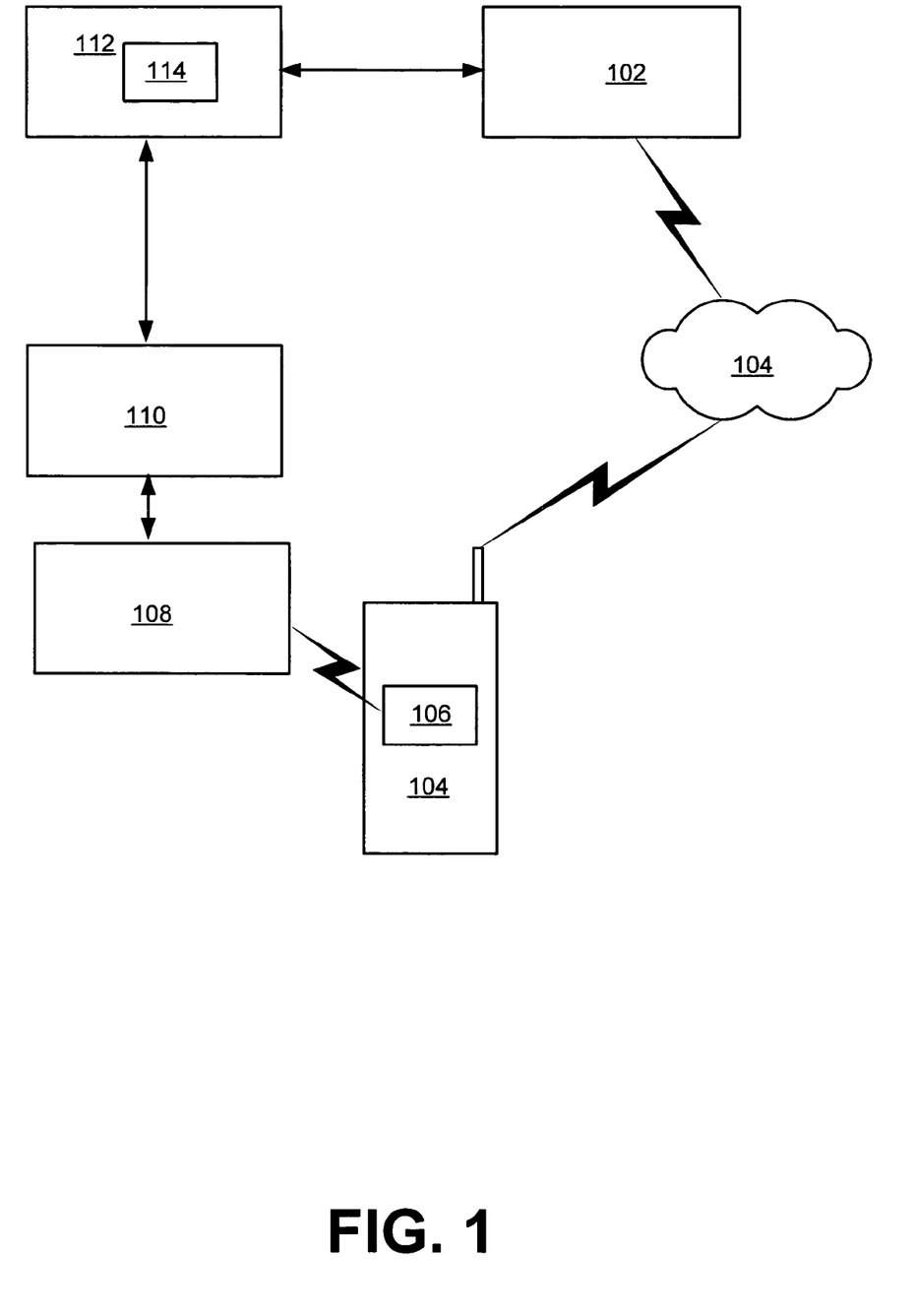
FIG. 1 is a block diagram of a system in which user can make contactless purchases.

Contactless cards and card readers are well known in the art and will not be discussed in detail. However, an overview a contactless card is provided. Typically, the contactless card 106 is powered by induction or high-frequency transmission techniques, which may be provided by the card reader 108. The contactless card 106 includes a transceiver (not shown) that is adapted to communicate contactlessly with the card reader 108. The contactless card also includes a memory (not shown), which has the financial account identifier stored therein. The financial account identifier is associated with a financial account such as a credit account and/or a debit account. It should be noted that the financial account may be a general purpose financial account provided by a bank, a co-brand financial account, and/or a private label financial account. For the purposes of this disclosure, a general purpose financial account is defined as a credit/debit account. For the purposes of this disclosure a co-brand financial account is defined as a credit/debit account in which at least two entities have their brands associated with the financial account. Some credit card issuers have gone into partnerships with universities to provide co-branded credit cards to, among others, alumni of the university, and a credit card having the name of the issuer and the name of the university would be a non-limiting example of a co-branded financial account. For the purpose of this disclosure, a private label financial account is defined as a financial account that may be used to purchase goods and services through one entity. A retail store brand credit card is a non-limiting example of a private label financial account.

When the contactless card 106 is brought into proximity with the card reader 108, the contactless card 106 is powered and provides the card reader 106 with information such as the financial account identifier. Typically, the contactless card 106 and card reader 108 are configured to communicate using well known techniques and protocols such as, but not limited to, ISO/IEC 14443 technologies such as, but not limited to, Radio Frequency Identifier (RFID), Bluetooth, Near Field Communication (NFC) RFID, and IR Infra-red.

The card reader 108 may be configured to interface with a terminal 110 such as a modern cash register. The terminal 110 is configured to be used by a salesperson/clerk for, among other things, facilitating the sale of goods and/or services. When the customer of the telephone service provider 102 uses his financial account to purchase goods or services, a clerk (not shown) uses the terminal 110 to ring-up the purchase. The terminal receives the financial account identifier from the card reader 108 and transmits transaction information to a financial service provider 112. The transaction information may include, but is not limited to, a merchant identifier, the amount of the purchase, and the financial account identifier.

The financial service provider 112 provides financial services such as, but not limited to, providing financial accounts 114 including debit accounts and credit accounts to customers of the telephone service provider 102. In some embodiments, the financial accounts provided by the financial service provider 112 have the telephone service provider 102 as a private label. Among other things, the financial service provider 112 may underwrite the applicant, using proprietary risk and credit scoring mechanisms, may establish the credit account, may service the account (including mailing the credit device, sending statements and collecting payments) and may assume the financial liability.

Figure 2A:
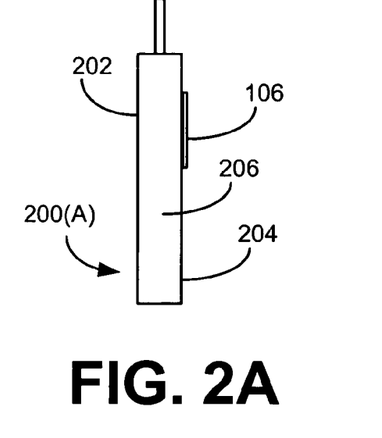
FIGS. 2A-2D illustrate exemplary embodiments of a mobile telephone and a contactless card.
Figure 2B:
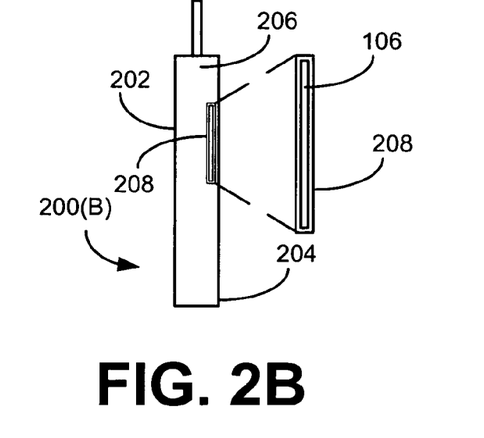
Figure 2C:
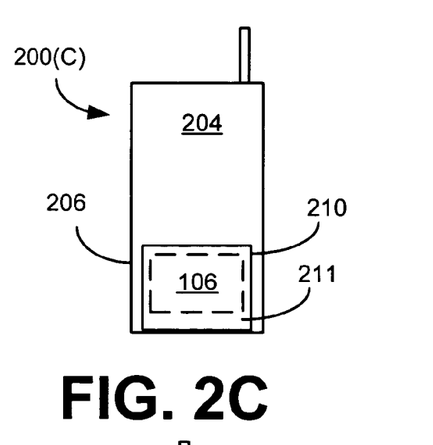
Figure 2D:
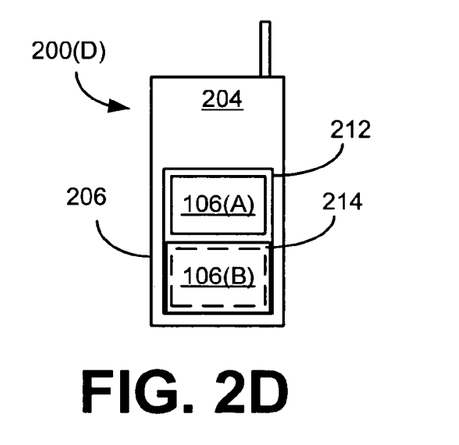

FIGS. 2A-2D illustrate some exemplary embodiments of a telephone having the contactless card 106. FIGS. 2A-2B are side views of a telephone, and FIGS. 2C-2D are elevated views of a backside of a telephone. Referring to FIG. 2A, a telephone 200(A) has a front side 202, a backside 204, and a side 206. In one embodiment, the contactless card 106 may be attached to the backside 204 by an adhesive, glue, resin or other coupler known to those skilled in the art. In some embodiments, the contactless card 106 may be removably attached to the telephone 200(A). Removably affixing the contactless card 106 enables the customer to transfer the contactless card 106 to a different telephone or a different device according to the desires of the customer. In yet other embodiments, the contactless card 106 is permanently coupled to the telephone 200(A). The contactless card 106 may be permanently coupled to the backside 204 during the manufacturing process of the telephone 200(A). Alternatively, the contactless card 106 may be permanently coupled to the backside 204 after the telephone 200(A) has been manufactured. It should be noted that in some embodiments, the contactless card 106 may be configured to break, tear, or become inoperable in other ways, during attempted removal of the contactless card 106 from the telephone 200(A). As a non-limiting example, the contactless card 106 might be a RFID transceiver having tear lines and/or score lines. As those skilled in the art know, some mobile telephones include a removable SIM card, which can be inserted into the mobile telephone, and in some embodiments, the removable SIM card many include a contactless card 106. A SIM having a contactless card may be manufactured such that the contactless card is an integral component or part of the SIM or the contactless card may be affixed to the SIM. It should be noted that even when the SIM is manufactured such that the contactless card is an integral component, or part, of the SIM, the contactless card may be electrically isolated from other components of the SIM (and the mobile telephone) or the contactless card may be in electrical communication with other components of the SIM.

FIG. 2B illustrates a telephone 200(B) having front side 202, backside 204, and side 206. The side 206 defines an opening 208 that leads into a cavity. The opening 208 and the cavity are configured to receive the contactless card 106. The contactless card 106 may be slid into and out of the cavity of the telephone 200(B) via the opening 208. In some embodiments, the telephone 200(B) may include a cover or plug (not shown) that is received by the opening 208. When the contactless card 106 is placed in the cavity and a cover (or plug) is received by the opening 208, thereby blocking some or all of the opening 208, the contactless card 106 is prevented from being slid out of the cavity. It should be noted that the telephone 200(B) may also include door that can be opened and closed to cover and uncover the opening 208.

FIG. 2C illustrates a telephone 200(C) having backside 204 and side 206. The backside 206 includes a cover 210 that covers a cavity 211. Disposed in the cavity 211 is the contactless card 106. In some embodiments, the cover 210 separable from the backside 206, and in yet other embodiments, the cover 210 is hinged or slidably coupled to the telephone 200(C). In some embodiments, cavity 211 is configured to receive a battery (not shown) for the telephone 200(C), and the contactless card 106 is configured to fit in the battery cavity 211 along with a battery.

FIG. 2D illustrates a telephone 200(D) having backside 204 and side 206. In this embodiment, the telephone 200(D) has two contactless cards 106(A) and 106(B) attached to the backside 204. It should be noted that in other embodiments more than two contactless cards may be attached to the telephone 200(D). The contactless card 106(A) carries a first account identifier for a first financial account, and the contactless card 106(B) carries a second account identifier for a second financial account.

The backside 206 defines an opening 212 in which the contactless cards 106(A) and 106(B) are disposed. A shield 214 is slidably coupled to the backside 206 and covers at least a portion of the opening 212 and is configured to slide up and down the opening 212. When the shield 214 is slid to the bottom portion of the opening 212, the shield 214 covers the contactless card 106(B), and when the shield is slid to the upper portion of the opening 212, the shield 214 covers the contactless card 106(A). The shield 214 is configured to prevent the covered contactless card from interfacing with a card reader by acting as a Gaussian shield. In some embodiments, the telephone 200(D) might include one or more shields hingedly coupled to the telephone 200(D). Hinged shields enable a customer to selectively expose and shield contactless cards.

Figure 3:
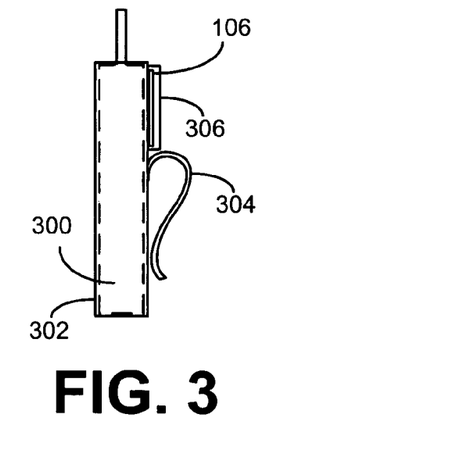
FIG. 3 illustrates an exemplary embodiment of a sleeve that carries a mobile telephone and a contactless card.

FIG. 3 illustrates yet another embodiment in which a telephone 300 is at least partially covered by a sleeve 302. The sleeve 302 forms a protective cover for the telephone 300 and includes a clip 304. Typically, the clip 304 is used for removably coupling the sleeve 302 and telephone 300 to a belt (not shown) or a purse (not shown) or other item. In this embodiment, the sleeve 302 also includes a pouch 306. The pouch 306 is configured to receive the contactless card 106. In this manner, the customer can use the sleeve 302 to carry both his or her telephone and the contactless card 106.

Figure 4:
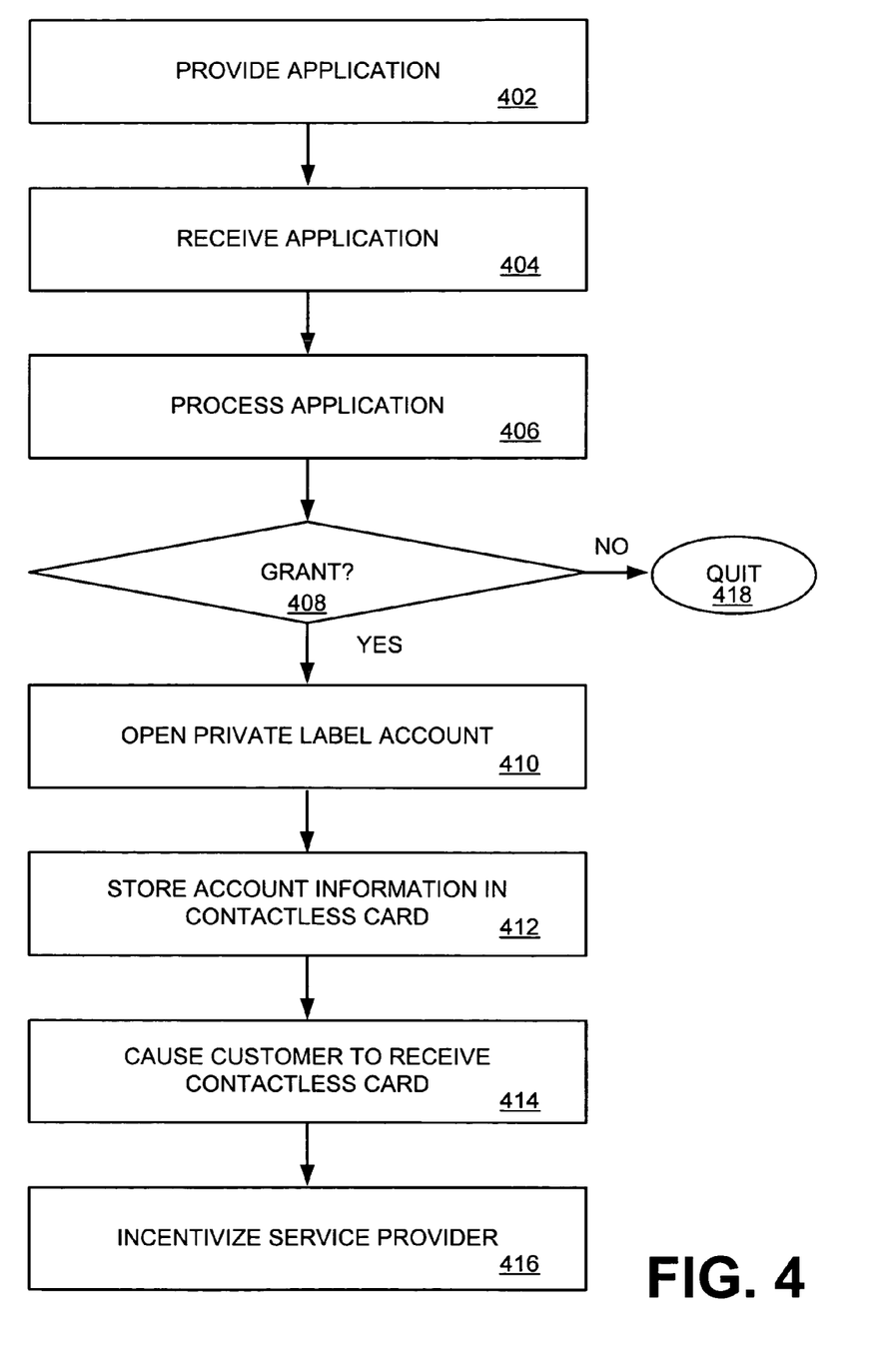
FIG. 4 is a flow chart illustrating operations for providing an applicant with a mobile telephone service and a financial account.

FIG. 4 is a flow chart of steps that may be performed by various entities such as the telephone service provider 102, the financial service provider 112, and/or by an agent or agents of either one of, or both, the telephone service provider and financial service provider 112.

In step 402, a user/organization/entity is provided with an application for enrollment for services offered by the telephone service provider 102. (Hereinafter organizations and entities applying for services offered by the telephone service provider 102 are referred to as user.) The application may be provided by the telephone service provider 102 or by an agent. For example, the application can be provided at a store front office of the telephone service provider 102 or other location or via a direct mailing or via a telephone solicitation. The application includes an application for telephone services and an application for a financial account. Information included in the application may include, but is not limited to, user name, social security number, financial information such as credit information, employment information, and place of residence. In some embodiments, when the user applies for enrollment with the telephone service provider 102, the application for enrollment includes a notice to the user that information included therein can be used for establishing a financial account for the user. Thus, the application for enrollment with the service provider can also be an application for a financial account.

In step 404, the financial service provider 112 receives the user's application for the financial account, and in step 406, the financial service provider 112 processes the application for the financial account. The financial service provider 112 may use information in the application and other information to process the application. For example, the financial service provider 112 may access databases such as, but not limited to, a credit reporting database to determine, among other things, the credit score of the user. The financial service provider may incorporate the information from the databases in processing the application for the financial account. It should be noted that in alternative embodiments, an entity separate from the financial service provider 112 could process the application for the financial account.

In step 408, a determination is made on whether to grant or deny the application for the financial account. If the application is denied, then the process ends at step 418.

However, if the application is granted, then the process continues at step 410.

It should be noted that in alternative embodiments, the application for the telephone service and the application for the financial account can be processed concurrently. For example, in one embodiment, the telephone service provider may perform steps 404, 406, and 408 for both the applications. And in yet other embodiments, a third party—a party that is neither the telephone service provider nor the financial service provider—may perform steps 404, 406, and possibly 408. The third party may be contracted by either the telephone service provider 102 or by the financial service provider 112 or by both the telephone service provider 102 and the financial service provider 112. In some embodiments, the third party may grant or deny one or both of the application, and in other embodiments, the third party may report a recommended action—grant or deny—and the telephone service provider or the financial service provider may decide to act in accordance with the recommendation of the third party or may decide to act contrary to the recommendation of the third party.

In step 410, in response to granting the application for the financial account, the financial service provider 112 opens a financial account for the user. It should be remembered that in some embodiments the telephone service provider 102 grants the application, in other embodiments the financial service provider 112 grants the application, and in yet other embodiments a third party may grant the application. Thus, the opening of the financial account is caused by whom ever—telephone service provider 102, financial service provider 112, or third party—granted/approved the application for the financial account.

In step 412, information related to the user's financial account is stored in a contactless card. The information may include the financial account identifier and other information such as, but not limited to, account number, expiration date, first and last name, address and security code. In some embodiments, the telephone service provider 102 may have the equipment for storing information in contactless cards, and the telephone service provider 102 may actually perform the step of storing the information in the user's contactless card. In other embodiments, the financial service provider 112 may have the equipment for storing information in contactless cards, and the financial service provider 112 may actually perform the step of storing the information in the user's contactless card. In yet other embodiments, a fourth party (and/or the aforementioned third party) may have the equipment for storing information in contactless cards, and the fourth party (and/or the aforementioned third party) may actually perform the step of storing the information in the user's contactless card. In the case of the third or fourth parties storing the information, either the financial service provider and/or the telephone service provider would cause the third and/or fourth party to store the information. For example, the financial service provider might have a contract with a fourth party such as, but not limited to, a provider and/or manufacturer of contactless cards, and the contact might stipulate that the provider and/or manufacturer is to store information in the contactless cards.

In step 414, the telephone service provider 102 and/or the financial service provider 112 cause the user to receive the contactless card having the financial account identifier for the user's financial account 114. In some embodiment, the telephone service provider 102 may cause the user to receive the contactless card. For example, in some embodiments, the telephone service provider may send, or cause another party to send, a telephone having the contactless card the user. Alternatively, the telephone service provider may send, or cause another party to send, a contactless card, which the user may or may not, attach to a telephone of the user. Similarly, the financial service provider may send, or cause another party to send, a contactless card and/or a telephone having a contactless card to the user.

In step 416, the telephone service provider is incentivized to have its customers receive financial accounts. One incentive, among others, is to promote further branding of the telephone service provider's label. Typically, the label of the financial accounts is the label of the telephone service provider. However, the label might be a different label.

Another incentive, among others, is that the telephone service provider may receive a financial benefit. For example, in one embodiment, telephone services of customers of the telephone service provider that have a financial account can be charged to the financial account of the user. Thus, the telephone service provider may receive payment for the telephone services of the users having the financial accounts from the financial service provider, who then charges the users having the financial accounts. Frequently, the financial service provider is more conscientious about paying the charges in a timely manner, and consequently, the amount of overdue charges owed to the telephone service provider by its customers is reduced. Furthermore, the payment stream from the financial service provider to the telephone service provider can be, and normally is, very predictable. The predictability of the payment stream is another financial benefit received by the telephone service provider. In addition, in one embodiment, the financial service provider may underwrite the charges of the users having the financial accounts, and consequently, the telephone service provider would not have to be concerned about non-payment from customers having financial accounts. Other financial incentives include, but are not limited to, the telephone service provider receiving a percentage of charges applied against the financial accounts, receiving a set amount for each financial account, receiving a set amount per predetermined time span (such as a month) for each financial account, receiving a set amount for each application for a financial account. Another benefit is that the telephone service provider may control the entire customer relationship, and is not vying for the customer with third party banks.

Figure 5:
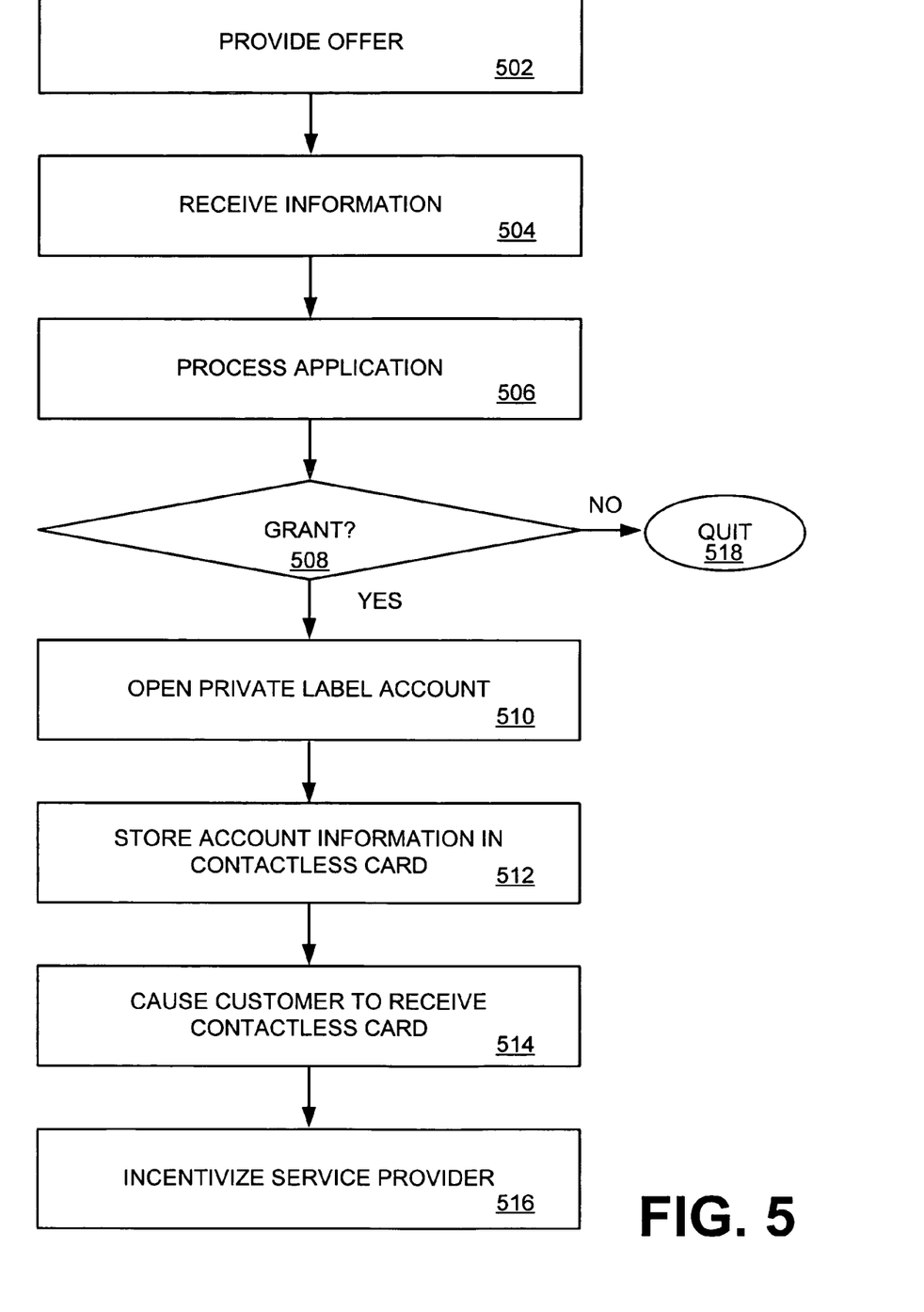
FIG. 5 is a flow chart illustrating operations for providing an existing customer of a telephone service provider with a financial account.

It should be noted that step 402 involved a user applying for telephone service and for a financial account. Whereas FIG. 5 illustrates for existing users of the telephone service provider.

In step 502, an offer for a financial account is extended to a customer the telephone service provider 102. The offer is normally extended in the form of an application. Frequently, the offer can be extended in material included with a bill from the telephone service provider to a customer of the telephone service provider. In some embodiments, all existing customers of the telephone service provider may receive an offer or all existing customers that do not have a financial account may receive an offer or pre-selected customers of the telephone service provider may receive an offer. The pre-selection can be done by the telephone service provider and/or by the financial service provider. Furthermore, in some embodiments, the offer can be in the form of a "pre-approved" application. It should be noted that in some embodiments the offer can be extended via telephone solicitation and/or the internet.

In step 504, after the customer has accepted the offer, information about the applicant is received. The information may include, but is not limited to, name, address, social security, employment information such as employment history (where the applicant is employed, by whom, length of employment, and past employment history), and financial information such as, but not limited to, income, expenses such as rent and/or mortgage payments, etc. Typically, the received information is carried in an application that the customer has completed.

In step 506, the application for the financial account is processed. Typically, the financial service provider 112 processes the application, but in some embodiments, the telephone service provider 102 or a third party may process the application. The processor of the application, i.e. the financial service provider or telephone service provider or third party, may use information in the application and other information to process the application. For example, the application processor may access databases such as, but not limited to, a credit reporting database to determine, among other things, the credit score of the user. The application processor may incorporate the information from the databases in processing the application for the financial account.

In step 508, a determination is made on whether to grant or deny the application for the financial account. If the application is denied, then the process ends at step 518. However, if the application is granted, then the process continues at step 510.

In some embodiments, the third party may grant or deny the application, and in other embodiments, the third party may report a recommended action—grant or deny—and the telephone service provider or the financial service provider may decide to act in accordance with the recommendation of the third party or may decide to act contrary to the recommendation of the third party.

In step 510, in response to granting the application for the financial account, the financial service provider 112 opens a financial account for the user. It should be remembered that in some embodiments the telephone service provider 102 grants the application, in other embodiments the financial service provider 112 grants the application, and in yet other embodiments a third party may grant the application. Thus, the opening of the financial account is caused by whomever—telephone service provider 102, financial service provider 112, or third party—granted/approved the application for the financial account. It should be noted that, within the United States of America, an accredited bank has to open a credit financial account, but while the bank may actually open the account, for the purposes of this disclosure, the party that granted/approved the application is considered to have caused the bank to open the account.

In step 512, information related to the user's financial account is stored in a contactless card. The information may include the financial account identifier and other information such as, but not limited to, account number, expiration date, security code, name, address, and telephone number. In some embodiments, the telephone service provider 102 may have the equipment for storing information in contactless cards, and the telephone service provider 102 may actually perform the step of storing the information in the user's contactless card. In other embodiments, the financial service provider 112 may have the equipment for storing information in contactless cards, and the financial service provider 112 may actually perform the step of storing the information in the user's contactless card. In yet other embodiments, a fourth party (and/or the aforementioned third party) may have the equipment for storing information in contactless cards, and the fourth party (and/or the aforementioned third party) may actually perform the step of storing the information in the user's contactless card. In the case of the third or fourth parties storing the information, either the financial service provider and/or the telephone service provider would cause the third and/or fourth party to store the information. For example, the financial service provider might have a contract with a fourth party such as, but not limited to, a provider and/or manufacturer of contactless cards, and the contact might stipulate that the provider and/or manufacturer is to store information in the contactless cards.

In step 514, the telephone service provider 102 and/or the financial service provider 112 cause the user to receive the contactless card having the financial account identifier for the user's financial account 114. In some embodiment, the telephone service provider 102 may cause the user to receive the contactless card. For example, in some embodiments, the telephone service provider may send, or cause another party to send, a telephone having the contactless card the user. Alternatively, the telephone service provider may send, or cause another party to send, a contactless card, which the user may or may not, attach to a telephone of the user. Similarly, the financial service provider may send, or cause another party to send, a contactless card and/or a telephone having a contactless card to the user.

In step 516, the telephone service provider is incentivized to have its customers receive financial accounts. One incentive, among others, is to promote further branding of the telephone service provider's label. Typically, the label of the financial accounts is the label of the telephone service provider. However, the label might be a different label.

Another incentive, among others, is that the telephone service provider may receive a financial benefit. For example, in one embodiment, telephone services of customers of the telephone service provider that have a financial account can be charged to the financial account of the user. Thus, the telephone service provider may receive payment for the telephone services of the users having the financial accounts from the financial service provider, who then charges the users having the financial accounts. Frequently, the financial service provider is more conscientious about paying the charges in a timely manner, and consequently, the amount of overdue charges owed to the telephone service provider by its customers is reduced. In addition, in one embodiment, the financial service provider may underwrite the charges of the users having the financial accounts, and consequently, the telephone service provider would not have to be concerned about non-payment from customers having financial accounts. Other financial incentives include, but are not limited to, the telephone service provider receiving a percentage of charges applied against the financial accounts, receiving a set amount for each financial account, receiving a set amount per predetermined time span (such as a month) for each financial account, receiving a set amount for each application for a financial account.

Figure 6:
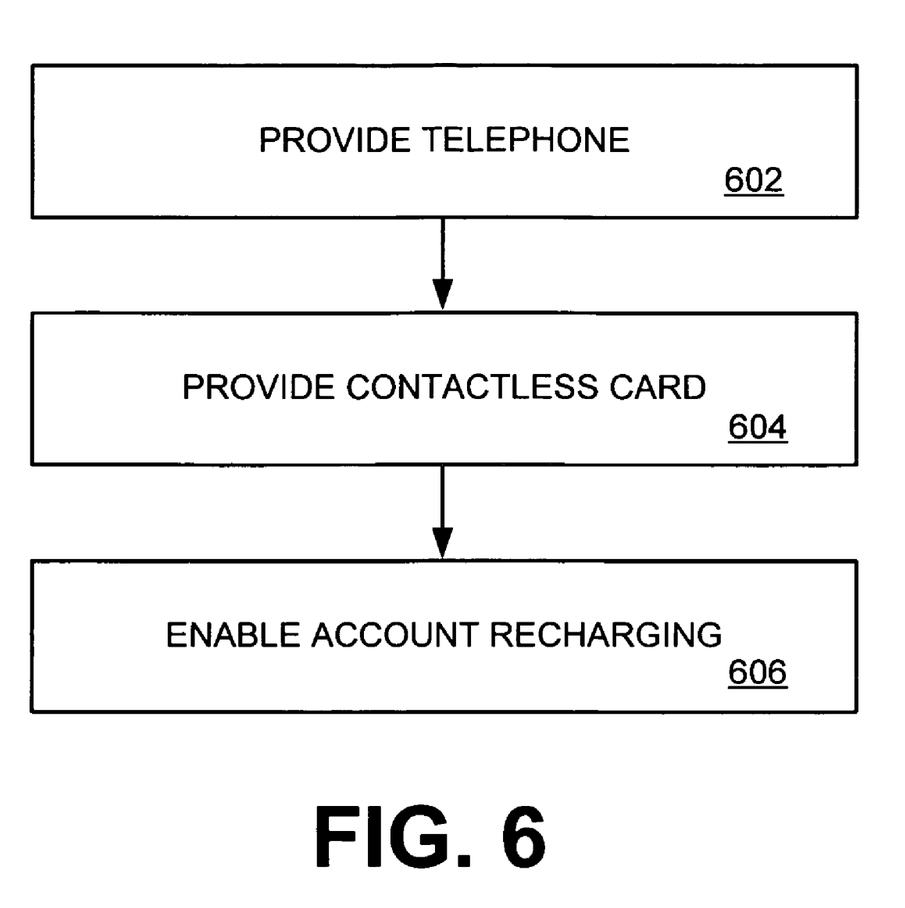
FIG. 6 is a flow chart illustrating operations for providing a customer with a financial account.

Referring to FIG. 6, which illustrates yet another embodiment, a user is provided with a telephone in step 602. Typically, the user may purchase a telephone at a store, and the telephone might be a telephone with pre-paid service. In step 604, the user is provided with a contactless card having a financial account identifier. Typically, the financial account associated with the financial account identifier is a debit account. In some embodiments, the user may select to deposit money in the debit account, which is normally accomplished by giving the seller of the telephone a given amount of money to be deposited in the debit account. In other embodiments, the price of the telephone may include a predetermined amount of money in the debit account. In the case where the telephone is a pre-paid service telephone and the financial account is a debit account, the telephone and the contactless card are normally purchased together.

In step 606, the user of the telephone and financial account is enabled to recharge, i.e. deposit money, in the financial account. In some embodiments, the user might go to a store or place of business to deposit money into the financial account. Alternatively, the user might send a deposit to the financial service provider.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method of providing credit, the method comprising the steps of:
    receiving an application for a credit account provided by a financial service provider, wherein an applicant submits the application from a mobile telephone via a mobile telephone service provided by a telephone service provider, and the application includes information about the applicant;
    qualifying the applicant for the credit account based at least in part on information included in the application;
    providing the qualified applicant a contactless card having an identifier of the credit account therein, the contactless card comprising a separate physical device than the mobile telephone and configured to contactlessly provide the identifier to a reader for purchasing a good or service via the credit account;
    attaching the contactless card to the mobile telephone, wherein the contactless card is electrically isolated from electrical circuitry of the mobile telephone; and
    the financial service provider compensating the telephone service provider for enabling the contactless card to be provided to the applicant and attached to the mobile telephone.

2. The method of claim 1, wherein the financial service provider compensating the telephone service provider comprises the financial service provider paying the telephone service provider for the mobile telephone services provided to the applicant.

3. The method of claim 1, wherein the contactless card is removably attached to the mobile telephone.

4. The method of claim 3, wherein the contactless card is integrated with a SIM card of the mobile telephone.

5. The method of claim 1, wherein the financial service provider compensating the telephone service provider comprises the telephone service provider receiving a portion of charges applied against the credit account.

6. The method of claim 1, wherein the mobile telephone defines a housing having an exterior surface, and wherein the contactless card is configured to couple to the exterior surface.

7. The method of claim 1, wherein the mobile telephone defines a housing having an exterior surface, and wherein the contactless card is configured to adhere to the exterior surface.

8. The method of claim 1, wherein the mobile telephone defines a housing, and wherein the housing is configured to receive the contactless card.

9. The method of claim 8, wherein the housing includes a cavity configured to receive the contactless card.

10. The method of claim 1, wherein the credit account is associated with the telephone service provider.

11. The method of claim 1, wherein the credit account is a private label account.

12. The method of claim 1, wherein the credit account is a co-branded account.

13. The method of claim 1, wherein the credit account is a general purpose account.

14. A method of providing credit to a customer of a telephone service provider, the method comprising the steps of:
   receiving at least a portion of an application for a mobile telephone service, wherein an applicant submits the application and the application includes information about the applicant, and wherein a telephone service provider provides the applied for mobile telephone service;
   determining whether the applicant qualifies for a credit account, wherein the determination is based at least in part on information included in the application;
   responsive to determining that the applicant is qualified for the credit account, a financial service provider opening the credit account;
   providing the applicant a mobile telephone for receiving the mobile telephone service;
   providing the applicant to a contactless card having an identifier of the credit account therein, wherein the contactless card comprises a separate physical device than the mobile telephone and is configured to contactlessly enable the applicant to purchase a good or service via the credit account by contactlessly providing the identifier to a reader;
   attaching the contactless card to the mobile telephone in electrical isolation from electrical circuitry of the mobile telephone; and
   the financial service provider compensating the telephone service provider for enabling the contactless card to be provided with and attached to the mobile telephone.

15. The method of claim 14, wherein the financial service provider compensating the telephone service provider comprises paying for at least a portion of the applicant's mobile telephone service charges.

16. The method of claim 14, wherein the contactless card is integrated with a SIM card of the mobile telephone.

17. The method of claim 14, wherein the contactless card is removably attached to the mobile telephone.

18. The method of claim 14, wherein the financial service provider compensating the telephone service provider comprises providing a portion of charges applied against the credit account.

19. The method of claim 14, wherein the mobile telephone defines a housing having an exterior surface, and wherein the contactless card is configured to couple to the exterior surface.

20. The method of claim 14, wherein the mobile telephone defines a housing having an exterior surface, and wherein the contactless card is configured to adhere to the exterior surface.

21. The method of claim 14, wherein the mobile telephone defines a housing, and wherein the housing is configured to receive the contactless card.

22. The method of claim 21, wherein the housing includes a cavity configured to receive the contactless card.

23. The method of claim 14, wherein the credit account is associated with the telephone service provider.

24. The method of claim 14, wherein the credit account is a private label account.

25. The method of claim 14, wherein the credit account is a co-branded account.

26. The method of claim 14, wherein the credit account is a general purpose account.

27. A method of integrating a financial service provided by a financial services provider with a mobile telephone service provided by a telephone service provider, the method comprising the steps of:
   providing a mobile telephone to a customer, wherein mobile telephone services for the mobile telephone are pre-paid and provided by a telephone service provider;
   providing a contactless card to the customer, the contactless card including an identifier associated with a debit account provided by a financial service provider, the contactless card comprising a separate physical device than the mobile telephone and configured to contactlessly provide the identifier to a reader for enabling the customer to purchase a good or service via the debit account, wherein the mobile telephone and the contactless card are configured to be attached to each other with the contactless card being electrically isolated from electrical circuitry in the mobile telephone.

28. The method of claim 27, wherein the debit account is provided to the customer with an initial monetary value, and the customer purchases the mobile telephone and the contactless card in a combined purchase from a seller.

29. The method of claim 28, farther comprising the customer purchasing at least one of additional pre-paid telephone services or additional monetary value for the debit account.

* * * * *